United States Patent [19]

Schmitt

[11] 4,317,311
[45] Mar. 2, 1982

[54] ADJUSTABLE PLANT RECEPTACLE

[76] Inventor: Nancy Schmitt, 8 Red Deer La., Huntington, N.Y. 11743

[21] Appl. No.: 109,890

[22] Filed: Jan. 7, 1980

[51] Int. Cl.³ .............................................. A01G 9/02
[52] U.S. Cl. ...................................... 47/66; 47/85
[58] Field of Search .......................... 47/66, 73–81, 47/84–87; 206/423; 229/16 A, 35, DIG. 8

[56] References Cited

U.S. PATENT DOCUMENTS

| 592,066 | 10/1897 | Simpson | 47/73 |
| 788,319 | 4/1905 | Klaffke | 47/73 |
| 1,123,289 | 1/1915 | Hellweg | 229/35 |
| 1,815,676 | 7/1931 | Medveczky | 47/79 |
| 2,140,932 | 12/1938 | Avery | 47/66 |
| 3,846,936 | 11/1974 | Kelley | 47/73 X |
| 3,991,516 | 11/1976 | Cicero | 47/73 X |
| 4,112,619 | 9/1978 | Morsani et al. | 47/66 |
| 4,216,622 | 8/1980 | Hollenbach et al. | 47/73 X |

FOREIGN PATENT DOCUMENTS

| 564544 | 11/1932 | Fed. Rep. of Germany | 47/80 |
| 2331281 | 5/1974 | Fed. Rep. of Germany | 206/423 |

Primary Examiner—James R. Feyrer
Attorney, Agent, or Firm—Posnack, Roberts, Cohen & Spiecens

[57] ABSTRACT

A plant receptacle in which a base is provided with sets of upstanding circular ribs adapted to selectively accommodate different cylinders which are formed out of sheets rolled into circular cross-sections, the sheets having free ends which are locked together by one of a number of forms of connecting devices. The cylinders sit on top of a perforated support which is supported over the bottom of the base in order to allow drainage. The circular ribs are provided with openings which also allow drainage having connection with an exposed portion of the base to provide for evaporation. There is also provided a method in accordance with which the initial growth of a plant is accommodated within the smaller cylinder whereafter the smaller cylinder is encircled by the larger cylinder whereafter the smaller cylinder is detached and the annular space between the original soil and the second cylinder is filled in with additional soil to accommodate additional growth of the plants.

2 Claims, 8 Drawing Figures

U.S. Patent     Mar. 2, 1982     4,317,311
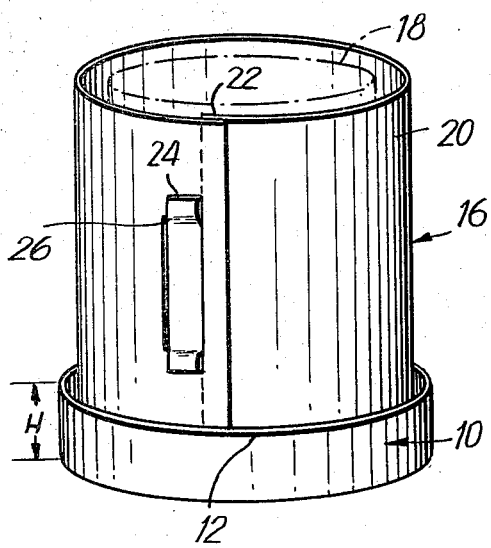
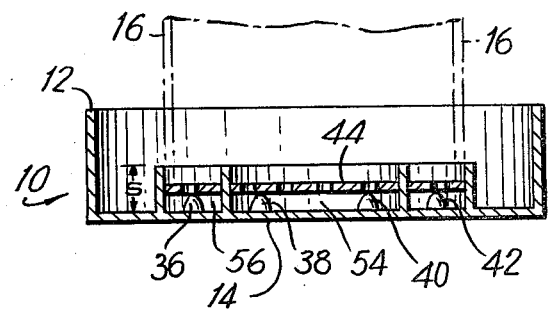
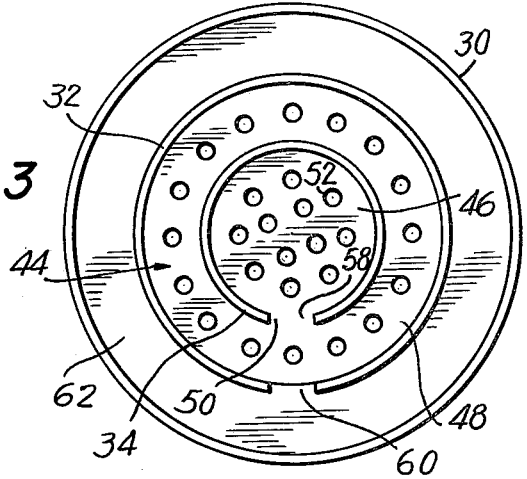
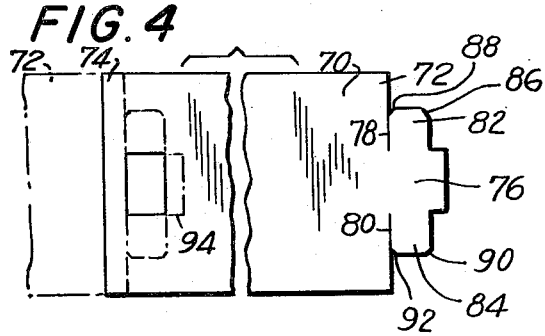
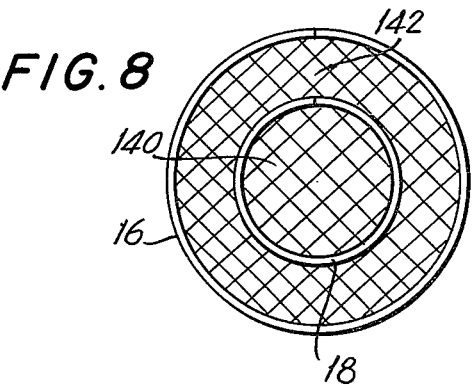
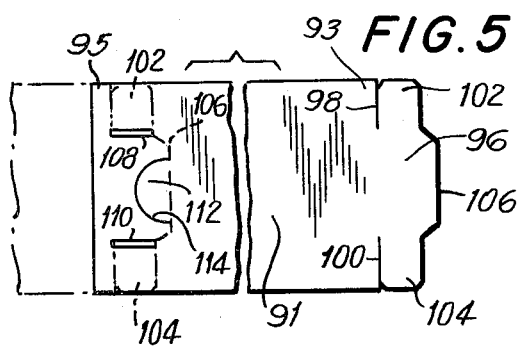
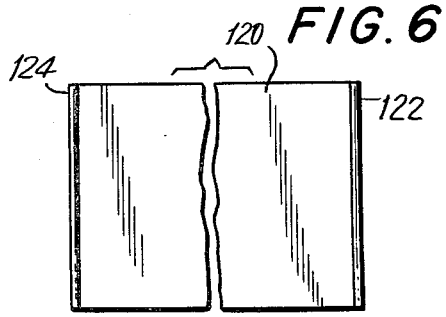
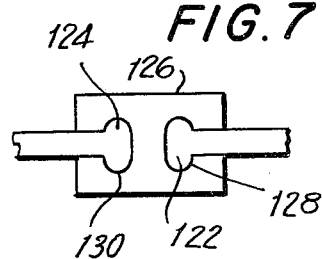

ADJUSTABLE PLANT RECEPTACLE

FIELD OF INVENTION

This invention relates to plant receptacles and more particularly, to plant receptacles which are adapted to accommodate the growth of botanical life. The invention also relates to methods for enlarging the soil volume which is made available to growing botanical life.

BACKGROUND OF THE INVENTION

Numerous prior patents have disclosed plant receptacles which are made in various forms involving the formation of a cylinder or the adjustment of the receptacle for one purpose of another. Such patents include U.S. Pat. Nos. 310,592; 1,886,690; 2,140,932, 2,960,799; and French Pat. No. 1,319,409.

J. B. Johnson in U.S. Pat. No. 310,592 illustrates a transplanting device by which a cylinder is formed in such a manner that it is useful for transplanting a plant from one area to another. This patent shares in common with the invention of the instant application the utilization of a cylinder formed of a circular sheet, the free ends of which must be attached. However, as will be shown in greater detail hereinafter, this patent shares nothing else in common with the present invention.

E. Janssen in U.S. Pat. No. 1,886,690 discloses an indoor plant starter in which a cylindrical receptacle is formed of a sheet, the free ends of which are locked together by means of a tail fitting in a slit. This arrangement of a tab fitting in a slit is shared in common with the present invention, but there is nothing else in the Janssen patent which relates to the subject matter of the present invention.

H. C. Avery in U.S. Pat. No. 2,140,932 reveals a pot or container wherein a bottom is coupled to a sheet which can be formed into a cylinder with the free ends of the sheet being coupled by a tab and slot arrangement. This is also shared in common with the present invention, but the patent has nothing else which enables the various objects of the present invention to be achieved as will be disclosed hereinafter.

F. M. Schneider in U.S. Pat. No. 2,960,799 reveals a transplanting pot consisting of two halves connected together thereby permitting adjustment of the same, but this patent fails to anticipate the significant features of the present invention as will be shown hereinafter.

In French Pat. No. 1,319,409 is shown an arrangement somewhat similar to that of the aforedescribed U.S. Pat. No. 2,960,799. However, aside from permitting a lateral displacement of a receptacle from soil which might be contained therein, there is nothing in the French Pat. No. 1,319,409 which enables the various objects and advantages of the invention to be obtained as will become apparent hereinafter.

As will be described in detail subsequently, the present invention utilizes different arrangements for coupling the free ends of sheets in order to form a cylindrical receptacle. Some generally similar constructions have been indicated hereinabove. In addition, many other arrangements can be found wherein a sheet is formed into a cylinder as, for example, disclosed in U.S. Pat. Nos. 333,643 and 448,143.

In U.S. Pat. No. 333,643, W. W. D. Lewis illustrates a paper box having an attached bottom with the side of the box being formed of a sheet having free ends coupled together by a tab and slit arrangement. Similarly, M. H. Piper in U.S. Pat. No. 448,143 reveals a folding flower pot whereof the bottom is formed of a series of crescents and the side is provided with free ends which are connected by a tab and slot arrangement. Aside from the structural features of generating a cylinder there is nothing in these patents to anticipate the novel concepts which form an integral part of the present invention.

Other U.S. patents revealing tab and slot arrangements are to be found in U.S. Pat. Nos. 1,117,625 to F. Ball and 3,208,478 to J. K. Baines. These patents also fail to reveal the characterizing features of the invention as will be seen hereinafter.

As will be shown the, present invention employs a base utilizing a plurality of circular ribs to selectively accommodate one of a plurality of cylinders. While this feature has not been found in any prior art known to the applicant, there are a number of patents in which a cover is used in a reverse sense with a plurality of ribs to support such cover on a cylindrical wall. Such patents include U.S. Pat. Nos. 893,469; 1,361,348; 2,736,536; and 3,141,567.

F. Essmuller in U.S. Pat. No. 893,469 shows a cover arrangement supported by a stepped arrangement of ribs on a cylindrical wall. H. W. Pfisterer shows in U.S. Pat. No. 1,361,348 a cooking utensil lid adapted for adjustment for support on pots of various diameters. B. B. Banowitz in U.S. Pat. No. 2,736,536 reveals an arrangement for supporting a cooking vessel cover and agitator on pots of different diameters. N. H. Schearer in U.S. Pat. No. 3,141,567 reveals a closure member having a plurality of downwardly directed projections adapted for engaging on receptacles of different sizes.

In addition to the foregoing, applicant is aware of a member of U.S. patents including U.S. Pat. Nos. 2,392,288; 1,896,229; 2,456,912; 2,732,091; 3,242,948; 3,655,089; 3,785,088; 3,961,444; and French Pat. No. 1,157,678. Various of these patents share minor features with the subject matter of the present invention without suggesting the whole or any significant part of the concept of the present invention.

Other prior art patents known to exist include U.S. Pat. Nos. 1,778,175; 1,810,236; 1,896,229; 2,189,982; 2,550,602; and British Pat. Nos. 1,717 and 123,853.

SUMMARY OF THE INVENTION

A goal of all lovers of plant life is to have their plants grow and flourish beautifully with as little bother and expense as possible and it is an object of the invention to provide improved apparatus and methods relating to such goal.

It is another object of the invention to provide an improved and uniquely designed contemporary flower pot which satisfies not only the aesthetically demanding plant lover, but also satisfies the practical and knowledgeable plant grower as well as the beginner.

Yet another object of the invention is to provide improved plant receptacle which allows a plant to grow within the original perimeter of its container without the bothersome and messy process of transplantation.

Still another object of the invention is to provide for the process of accommodating plant growth while avoiding the process of transplanting a plant from one pot to another, which possibly results in traumatic shock of a type well known to those who have known and grown plant life.

It is yet another object of the invention to provide for accommodating the growth of plant life without removing the plant from its original site.

Still another object of the invention is to provide an improved botanical apparatus which has significant economical features and which, additionally, is relatively easy to store.

Still another object of the invention is to provide an improved plant receptacle which is adapted for servicing not only individual plant owners, but wholesale nurseries and plant stores and the like.

Yet another object of the invention is to provide an improved plant receptacle embodying the foregoing features while at the same time being adapted for serving as a hanging plant receptacle as well as a table supported receptacle.

Still a further object of the invention is to provide the above improvements while adequately making provision for the evaporation of excess moisture.

Still another object of the invention is to minimize stem breakage in providing for the accommodation of plant growth and the like.

In achieving the above and other objects of the invention, there is provided a plant receptacle comprising a base means for supporting a plant and constituting a receptacle for soil and water, and containment means supported on said base means with selectively different cross-sections to accommodate different amounts of soil and thereby the growth of said plant.

According to a feature of the invention, guide means are provided on the base means to accommodate the different cross-sections of said containment means and hold the latter in position.

According to a further feature of the invention the aforesaid containment means may include at least first and second openable cylindrical means of different diameter selectively mountable on the aforesaid base means.

According to still another feature of the invention each said cylindrical means may include a flexible sheet rolled into cylindrical form with locking means being provided to hold the sheet in such cylindrical form.

In accordance with one embodiment of the invention, said cylindrical means may include opposite ends in juxtaposed positions and said locking means may include beads on said ends and coupling means to engage said beads and couple said ends together. According to another embodiment of the invention said coupling means may include a rod with an H-shaped cross-section defining openings to receive the aforesaid beads.

Yet another embodiment of the invention is one in which the aforesaid sheet includes opposite ends in juxtaposed position, one of said ends being provided with at least one opening and the other of said ends including at least one ear inserted in said opening to hold said ends together. One of these ends may include an abutment tab to hold said end in pre-determined overlapping relationship in accordance with still another feature of the invention.

According to another embodiment of the invention the opening may be rectangular in shape and an end of the sheet may include an extension including two ears extendable in opposite directions and inserted into the opening in latched relationship thereto.

The guide means which have been mentioned above may, according to a specific embodiment of the invention, be constituted by upstanding ribs of circular configuration. These circular ribs may be in concentric relationship. Moreover, according to one aspect of the invention the ribs may be provided with openings to permit the passage of water. Furthermore the above-noted base means may include a peripheral wall encircling the ribs thereby providing an arrangement wherein communication with ambient atmosphere is possible and provision is made for the evaporation of excess moisture.

According to still another aspect of the invention the aforesaid guide means may define a central area and an annular area encircling said central area and there may be provided perforate means in the central and annular areas above the base means to permit the drainage of water as aforesaid and in order to support the soil and the growing plant life at a fixed site.

In accordance with still another aspect of the invention, there is provided a method of maintaining a plant in different amounts of soil to accommodate plant growth. This method provided in accordance with the invention comprises rooting the plant in soil confined within a first removable cylinder of determinable cross-section for a first period of time, encircling the first said cylinder with a second cylinder to form an annular space between the cylinders, removing the first said cylinder to leave an annular space between the soil in which the plant is rooted and the second cylinder, and filling the latter said annular space with soil.

According to a further aspect of the method of the invention, the first said cylinder may be formed from a flat sheet having free ends which are temporarily locked together and the first said cylinder may be removed by unlocking said ends.

According to another aspect of the invention as has been indicated hereinabove, the second cylinder may also be formed from a flat sheet having free ends which are temporarily locked together when the flat sheet is rolled into a cylinder.

Other objects, features and advantages of the invention will be found in the detailed description which follows hereinafter as illustrated in the accompanying drawing.

BRIEF DESCRIPTION OF THE DRAWING

In the drawing:

FIG. 1 is a perspective view of a first embodiment of the invention constituting a plant receptacle with one of two cylinders positioned thereon;

FIG. 2 is a fragmentary cross-sectional view taken through a diametral section through the bottom of the plant receptacle of FIG. 1;

FIG. 3 is a top view of the base section of the construction illustrated in FIG. 2;

FIG. 4 illustrates, partially broken away, a flat sheet adapted to be formed into a cylinder in accordance with the invention;

FIG. 5 is a view corresponding to FIG. 4 of another embodiment of the invention;

FIG. 6 is a further view corresponding to FIGS. 4 and 5 of a further embodiment of the invention;

FIG. 7 is a top fragmentary view on enlarged scale of the locking means associated with FIG. 6; and FIG. 8 is a diagrammatic illustration of the method of utilizing the apparatus illustrated in FIGS. 1-7.

DETAILED DESCRIPTION

The invention is directed to the concept of an expandable plant receptacle or flower pot or the like comprised of a circular base having a plurality of co-axial radial grooves adapted to accommodate thin-wall cylinders of varying diameter. The thin wall cylinders are fabricated from a rectangular piece of plastic such as polyvinyl or the like which is held in a circular configuration by a locking arrangement of a variety of types which will be described hereinafter. By way of example, a pair of tabs may be formed in one end of a rectangular piece of sheet of material which are adapted to cooperate with slots formed in the opposite end of the material. A half circular segment or the like may be cut into the end of the material having the slots and is positioned so that the half circular section will form an additional tab to hold the edge of the opposite tab bearing end against the slotted end. Other arrangements will be shown in the detailed description which follows hereinafter. The base is made of a relatively strong material such as a high impact polystyrene and it cooperates positionally with the cylinder in a manner to be described in greater detail hereinafter. At this time, it is sufficient to note in general that the concept of the expandable flower pot is effected through preferred embodiments of the invention by the utilization of two or more cylinders of the above noted type, one of which is substituted for the other. At first, the plant life is grown within the first or smaller cylinder and when the roots thereof have grown to the extent limited by the geometrical shape and size of the first cylinder, the second cylinder is positioned around the first cylinder and the first cylinder is removed. This enables the accommodation to be made without the possibility of spilling soil and the like out of the receptacle. Thereafter, the annular space between the original soil and the second cylinder is filled with supplemental soil to create in total a larger growing place for the botanical life initially planted in the receptacle without exposing the plant to trauma or shock.

Reference to FIG. 1 will show a perspective view of a plant receptacle provided in accordance with the invention. Therein appears a relatively flat base 10 formed of a relatively strong plastic such as high impact polystyrene. Other materials may be employed such as metal, wood, natural and synthetic rubbers and the like. The base may, for example, have a height H which falls between the range of one-half to one and a half inches. These dimensions are given by way of example only and it is to be understood that the height of the base may be greater or lesser all within the scope of the present invention. The wall thickness of the outer perimeter of the base 10 as indicated at edge 12 may, for example, run between one sixteenth and one eighth of an inch although greater or lesser thicknesses will fall within the purview of the invention. The base 10 is also shown in FIG. 2 wherein it will be seen that the base comprises a bottom 14, the thickness of which is consistent with that of the edge 12. This bottom as well as the wall having the edge 12 is preferably imperforate although holes may be selectively and judiciously provided around the wall which is generally circular in conformation as desired.

Referring again to FIG. 1, it is seen that mounted in the base 10 is a cylinder 16. This cylinder is formed from a rolled sheet of flexible material such as, for example, polyvinyl or the like. The thickness of the wall is generally a lot less than that of the edge 12 and may, run, for example, from 1/64 to ⅛ of an inch provided that the necessary flexibility is provided. The cylinder 16 is the outer of two selectively employed cylinders in the embodiment of the invention illustrated in FIG. 1. A cylinder which has been previously employed and subsequently removed is indicated at 18. This cylinder has generally the same physical structure as the cylinder 16 with the exception that it is of smaller diameter.

As will be shown hereinafter, the cylinder 18 is the initial cylinder constituting all of or part of a containment means. In accordance with the invention, soil is contained within the cylinder 18 as will be shown in greater detail hereinafter and a plant or other such life is grown therein until the roots of the plant reach a growth stage where larger quarters are required. Thereafter, the cylinder 16 is placed around the cylinder 18 and the cylinder 18 removed. The cylinder 16 retains any soil which spills from the original volume of soil contained within cylinder 18 and defines an annular space with the original soil. This annular space is filled in with supplemental soil to provide a new and enlarged growth space for the botanical life contained within the plant receptacle.

As illustrated in FIG. 1, the cylinder 16 is formed from a rolled sheet 20 of material. This rolled sheet has overlapping free ends indicated in the area of overlap at 22. One free end is provided with a tab arrangement 24 with the other free end being provided, for example, with slots 26. The tabs or ears 24 engage in the slots 26 to hold the free ends of the sheet 20 together to form the cylinder 16. The provision of such a locking arrangement provides for the fastening and unfastening of the cylinder 16 in position without disturbing the contents of the cylinder 18 which is generally removed when the cylinder 16 has been put into position. In the broader aspect of the invention, there is included as well the concept of utilizing a single cylinder which is subsequently enlarged to provide the additional space for the supplemental soil.

The broader aspect of the invention also includes the possibility of utilizing more than two cylinders such as, for example, three or four cylinders with a larger base, the cylinders being subsequently removed from position as each additional and larger cylinder is moved into position. It will also be appreciated that the cylinders need not be circular in cross-section as illustrated since the cylinders may take other forms such as those of triangular, quadrilateral and other polylateral cross sections, such as, for example, octahedral with the base retaining its circular shape or not according to the aesthetic design of the overall receptacle.

It will also be understood from what has been stated hereinabove that, while the cylinders are preferably of plastic and preferably rolled from a flat sheet, it is included within the broader aspect of the invention that the cylinders be provided in prearranged shape, perhaps in nesting relationship for the respective use of the cylinders in the manner suggested hereinabove. The concept of employing flat sheets which are rolled into cylinders is principally for purposes of storage and to facilitate the disconnecting of the inner cylinder which is to be removed so that this task can be accomplished with a minimum of trauma or shock to the plant being grown and with a minimum loss of soil and messiness.

FIGS. 2 and 3 illustrate the conformation of the base in greater detail. Therein it will be seen that the base includes the outer wall 30 referred to generally hereinabove and furthermore includes two inner walls 32 and 34 all of these walls being generally circular in the preferred embodiment and being in concentric relationship with one another. It will be noted that the ribs 32 and 34 have a height S which is generally less than that of the wall 30. Thus, for example, if the wall 30 has a height H of approximately one inch, the walls 32 and 34 may preferably have equal heights or nearly equal heights in the range of, for example, one-half of an inch. These heights and relationships may vary slightly within the generalized scope of the invention. It will be noted that the ribs 32 and 34 are fairly sturdy as is the wall 30. Consequently, the walls 32 and 34 will be made of the same material as the wall 30 in monolithic arrangement and both of these will be preferably although not necessarily monolithic with the base 14.

As appears in FIG. 2, a plurality of projections or dimples are mounted on the bottom 14 as, for example, indicated at 36, 38, 40 and 42, there being a greater or lesser amount of these projections as required. These projections are intended to hold, in spaced relationship above the bottom 14, a perforated member indicated at 44, the plan view of which is seen in FIG. 3 whereat it is seen that a flat section of perforated member 44 indicated at 46 is connected to an encircling annular flat section 48 by means of a neck portion 50. The perforations are indicated generally at 52, there being a greater or lesser number of these perforations as required, the purpose of these perforations being to enable an expressing off of excess moisture which may have been placed into the superposed soil.

FIG. 2 illustrates in phantom lines the outer cylinder 16. This cylinder is mounted on the perforated member 44 as is the inner cylinder 18 before the removal of the same. Excess moisture may be expressed or fall by gravity into chamber 54 or 56. From these chambers, the fluid may pass via opening 58 corresponding to neck 50 or opening 60 into an outer annular chamber indicated at 62. This chamber exists between the wall 32 and wall 30 and is open upwardly to ambient atmosphere thereby permitting an evaporating of excess moisture from the plant receptacle whereby adding to the health and benefit of the botanical life in the receptacle.

In the aforegoing description, the projections or nipples 36, 38, 40 and 42 have been indicated as being formed integrally with the bottom 14. It will be understood that it is possible to place ledges on the ribs 32 and 34 to support the perforate member 44 or that as a further alternative, it would be possible to put depending projections on the perforated member 44 in such a manner that the latter would be supported in this alternative spaced from the bottom 14 so as to define chambers 55 and 56. In this manner, the perforated member 44 performs one of its important functions to wit: that of removing excess moisture from the soil in which the plant is being grown. The perforated member 44 has, however, an additional important function to perform in that it forms a support for the soil which ultimately comes to be molded in the form of a cylindrical slug sitting atop the perforated bottom 44. This slug generally has protrusions extending into the openings 52 as well as perhaps roots. The idea of this is that the soil slug remains in position in site on the perforated member 42 and the cylinder 18 is removed from its position within the circular rib 34. Thereby it is not generally possible to dislodge this slug unintentionally so that a clear cut and well defined annular supplement of soil may be placed around the same between this slug and the inner wall of the outer cylinder 16. This means that the plant has been effectively transplanted without being in any sense moved and that the new position of the plant is precisely and symmetrically arranged within the total amount of soil retained within the outer cylinder 16 as will be described in greater detail hereinafter.

FIGS. 4–6 illustrate different arrangements of flat plastic sheets or the like which can be rolled into cylinders and which are provided with locking means in accordance with the invention.

In FIG. 4 appears a sheet 70 of polyvinyl or the like, the sheet 70 having a free end 72 and a free end 74. At the free end 72 is integrally connected a protrusion or extension 76 having slits 78 and 80 separating the protrusion from the main body of the sheet thereby to form ears 82 and 84. Ear 82 is provided with bevel 86 and bevel 88, whereas ear 84 is provided with bevel 90 and bevel 92 whereby to facilitate a flexing of each ear and an inserting of the same into rectangular opening 94 provided in the other end of the sheet 70. It will be noted that the end 72 is shown in phantom lines at the left hand side of FIG. 4 to illustrate how the right end of the sheet is rolled around and employed with the left end of the sheet to lock each sheet in rolled and cylindrical conformation.

FIG. 5 is a view similar to FIG. 4 wherein is shown a sheet 90 having a free end 92 and a free end 94. The free end 92 is provided with a protrusion 96 having slits 98 and 100 forming ears 102 and 104. These ears are provided with bevels in the manner noted hereinabove with respect to FIG. 4. The protrusion 96 is furthermore provided with a trapezoidal extension 106, the purpose of which will become apparent hereinafter.

In the opposite end of the embodiment of the invention illustrated in FIG. 5 are provided two slots 108 and 110. These slots may alternatively be formed as slits. Also formed in the end 94 is a semicircular tab 112 formed by the cutting of a slit 114 into the sheet 90. The tab 112 accommodates receipt of the trapezoidal protrusion 106 whereas the slots 108 and 110 accommodate ears or tabs 102 and 104 respectively. Thereby, the free ends 92 and 94 are held together in locked relationship to form a cylinder of either of the two diameters noted hereinabove with respect to FIG. 1. It will be understood that, in the two embodiments described in FIGS. 4 and 5, the different diameters may be afforded preferably by the utilization of separate sheets of different lengths and thereby circumferences. Alternatively, provision may be made of a single sheet having double arrangements of slots or openings to accommodate the locking tabs formed at the upper end of such sheets.

FIG. 6 illustrates still a further embodiment of the invention wherein the plastic sheet 120 is provided with two edgewise disposed beads 122 and 124. The purpose of these beads is to enable a locking together of the respective ends as illustrated on enlarged scale in FIG. 8 wherein is shown a locking rod 126 provided with openings 128 and 130 to accommodate beads 122 and 124. Rod 126 which is a locking device may be made, for example, of high impact polystyrene, natural or synthetic rubbers, metal, wood or the like.

Each of the above embodiment has in common the advantage of flat storage and ease of manufacture. In addition, each provides the advantage that the cylinders may be opened laterally from the soil of the plant being grown thereby to minimize trauma relative to the same. Preferably, the sheets are provided with flat smooth surfaces other than for the locking arrangements discussed hereinabove. These flat smooth surfaces will deflect the penetration of plant roots whereby little or no trauma should occur so that the plants do not go into shock when an accommodation is made for the increasing growth of the same.

FIG. 8 illustrates diagrammatically how the method of the invention is practiced. First of all, an inner cylinder such as cylinder 18 is placed into position and the same is filled with soil such as indicated at 140 wherein the initial growth of the plant takes place. Such growth may take place, for example, from seeds or seedlings or the like. When the plant has attained full measure of growth within the cylinder 18 this will be readily apparent to the user of the type of plant receptacle being described.

With the cylinder 18 retained in position, the cylinder 16 is next placed in position thereby forming an annular space with the cylinder 18. With both cylinders firmly positioned in a base such as has been discussed hereinabove, the inner cylinder 18 is removed. This leaves the soil 16 in position preferably shaped by the length of time that is has occupied the cylinder 18 and the moisture contained therein which has been appropriately drained through the supporting perforated member. Generally, the removal of cylinder 18 can be achieved in a lateral sense with a minimum disturbing of the soil 140 and thereby with a minimum of trauma or shock to the plant growing therein. This can also be achieved with a minimum of loss of soil from slug 140 and that soil which is lost will be retained within the cylinder 16. As a consequence, the receptacle user will experience very little or minimal messiness or loss of soil in performing the described operations.

Thereafter the annular space remaining between the slug 140 and the cylinder 16 will be filled by an annular supplemental charge of soil such as indicated at 142. This will symmetrically position slug 140 centrally within the annular supplemental charge 142 and, therefore, will provide for equal opportunity of root growth radially outwards from the slug 140 as is preferred in botanical treatment.

By the above method and structures, the goal is accomplished for all plant lovers to have their plants grow and flourish beautifully with as little bother and expense as possible. The uniquely designed plant receptacle of the invention may be contemporaneously designed or otherwise to satisfy not only the aesthecially demanding plant lover, the also the practical and knowledgeable plant grower as well as the beginner.

From what has been indicated above, it will be appreciated that the receptacle of the invention allows the plant to grow within the original container without the bothersome and messy process of transplanting. As all plant growers know, the process of transplanting botanical life from one pot to another causes many plants to go into shock. The design of the invention eliminates the process of removing a plant from its original container by the simple method of inserting the larger outer cylinder in the outer ring of the base and easily removing the inner cylinder. All that has to be done in order for the plant to grow further is to add more soil and whatever nutrients may be selected.

The plant receptacle of the invention provides actually two receptacles for essentially the cost of one and, thereby, affords an extreme economy. Heretofore, small starter flower pots were used which generally were subsequently discarded or were retained thereby to take up storage space which the plant grower might put into better use. The plant receptacle of the instant invention is such that it may be dimensioned to service not only the individual plant owner, but also wholesale nurseries and plant stores and other similar type of establishments as well. It will be obvious that this plant receptacle has a construction which can be readily adapted to hanging as well as table supported flower pot design.

It will also appear that the design of the invention lends itself to relatively economical packaging and shipping. In fact, the blister type of packaging can be readily employed due to the utilization of relatively flat parts.

The rib means and the base section constitute guides which remove any guess work from the location of the cylinders and provide for readily accommodating the different cross sections of containment of the cylinders which are held in position and at least partially supported thereby. The locking means which hold the opposite ends of the flexible sheets in juxtaposed positions afford as well an unlocking means whereby lateral displacement of a cylinder from the contained soil slug can be practiced.

There will now be obvious to those skilled in the art many modifications and variations of the construction and methods set forth hereinabove. These modification and variations will not depart from the scope of the invention as defined by the following claims.

What is claimed is:

1. A plant receptacle comprising base means for supporting a plant and constituting a receptacle for soil and water, and containment means supported on said base means with selectively different cross-sections to accommodate different amounts of soil and thereby the growth of said plant, said containment means including at least first and second openable cylindrical means of different diameter selectively mountable on said base means, guide means on said base means to accommodate the different cross-sections of said containment means and hold the latter in position, said guide means being upstanding concentric ribs, said ribs being provided with openings to permit the passage of water, said guide means defining a central area and an annular area encircling said central area, flat perforate means in the central and annular areas above the base means to permit the drainage of water and to support the soil, and means to support the perforate means above the base means.

2. A plant receptacle comprising base means for supporting a plant and constituting a receptacle for soil and water, and containment means supported on said base means with selectively different cross-sections to accommodate different amounts of soil and thereby the growth of said plant, said containment means including at least first and second openable cylindrical means of different diameter selectively mountable on said base means, guide means on said base means to accommodate the different cross-sections of said containment means and hold the latter in position, said guide means being upstanding concentric ribs, said ribs being provided with openings to permit the passage of water, said guide means defining a central area and an annular area encircling said central area, and perforate means in the central and annular areas above the base means to permit the drainage of water and to support the soil, said perforate means including a flat perforated central section superposed above said central area, an encircling flat perforated section superposed above said annular area, and a neck portion connecting said central and annular sections, said neck portion extending through at least one of the openings in the ribs.

* * * * *